US009707900B1

(12) United States Patent
Townsend

(10) Patent No.: US 9,707,900 B1
(45) Date of Patent: Jul. 18, 2017

(54) VEHICLE ROOFTOP CARGO SYSTEMS AND METHODS FOR TRANSPORTING CARGO UPON THE ROOFTOP OF VEHICLES

(71) Applicant: Larry Townsend, Darby, MT (US)

(72) Inventor: Larry Townsend, Darby, MT (US)

( * ) Notice: Subject to any disclaimer, the term of this patent is extended or adjusted under 35 U.S.C. 154(b) by 0 days.

(21) Appl. No.: 14/290,841

(22) Filed: May 29, 2014

Related U.S. Application Data

(60) Provisional application No. 61/829,156, filed on May 30, 2013.

(51) Int. Cl.
*B60R 9/048* (2006.01)
(52) U.S. Cl.
CPC .................................. *B60R 9/048* (2013.01)
(58) Field of Classification Search
CPC .. B60R 9/00; B60R 9/04; B60R 9/048; B60R 9/05; B60R 9/055; B60P 7/00–7/04
USPC ......... 224/567–568, 324, 325, 328; D12/412
See application file for complete search history.

(56) References Cited

U.S. PATENT DOCUMENTS

| 2,589,772 | A | * | 3/1952 | Carter et al. .................. 224/320 |
| 3,146,824 | A | * | 9/1964 | Veilleux ................... B60J 7/085 160/23.1 |
| 3,806,185 | A | | 4/1974 | Brandjord |
| 4,277,220 | A | * | 7/1981 | Wiley ..................... B60P 1/006 296/100.01 |
| 4,369,009 | A | * | 1/1983 | Fulford ........................... 410/35 |
| 5,179,991 | A | | 1/1993 | Haddad, Jr. |
| 5,954,338 | A | | 9/1999 | Liggett |
| 5,996,867 | A | * | 12/1999 | Burgess et al. .............. 224/316 |
| 6,332,473 | B1 | | 12/2001 | Carden |
| 6,679,673 | B1 | | 1/2004 | Stahler et al. |
| 6,725,807 | B1 | * | 4/2004 | Tapia ................... A01K 1/0272 119/482 |
| 7,111,998 | B2 | | 9/2006 | Wright |
| 7,329,075 | B2 | * | 2/2008 | Boydstun, IV ........... B60P 3/08 410/100 |
| 8,016,172 | B1 | * | 9/2011 | Mefford ....................... 224/321 |
| 9,333,894 | B1 | * | 5/2016 | Hunting, Sr. ............ B60J 11/06 |
| 2005/0092796 | A1 | * | 5/2005 | Essig ............................ 224/321 |
| 2006/0011754 | A1 | * | 1/2006 | Farmer ......................... 239/722 |
| 2008/0116709 | A1 | * | 5/2008 | Royer ...................... B60J 7/085 296/98 |

FOREIGN PATENT DOCUMENTS

| FR | 1128639 | A | * | 1/1957 | ............. B60R 9/048 |
| FR | 1458188 | A | * | 11/1966 | ............. B60R 9/048 |
| GB | WO 9625305 | A1 | * | 8/1996 | ............. B60R 9/048 |

* cited by examiner

*Primary Examiner* — Justin Larson
*Assistant Examiner* — Phillip Schmidt
(74) *Attorney, Agent, or Firm* — Wells St. John P.S.

(57) ABSTRACT

Vehicle rooftop cargo systems and methods for transporting cargo such as baled hay upon the rooftop of vehicles are provided.

7 Claims, 6 Drawing Sheets

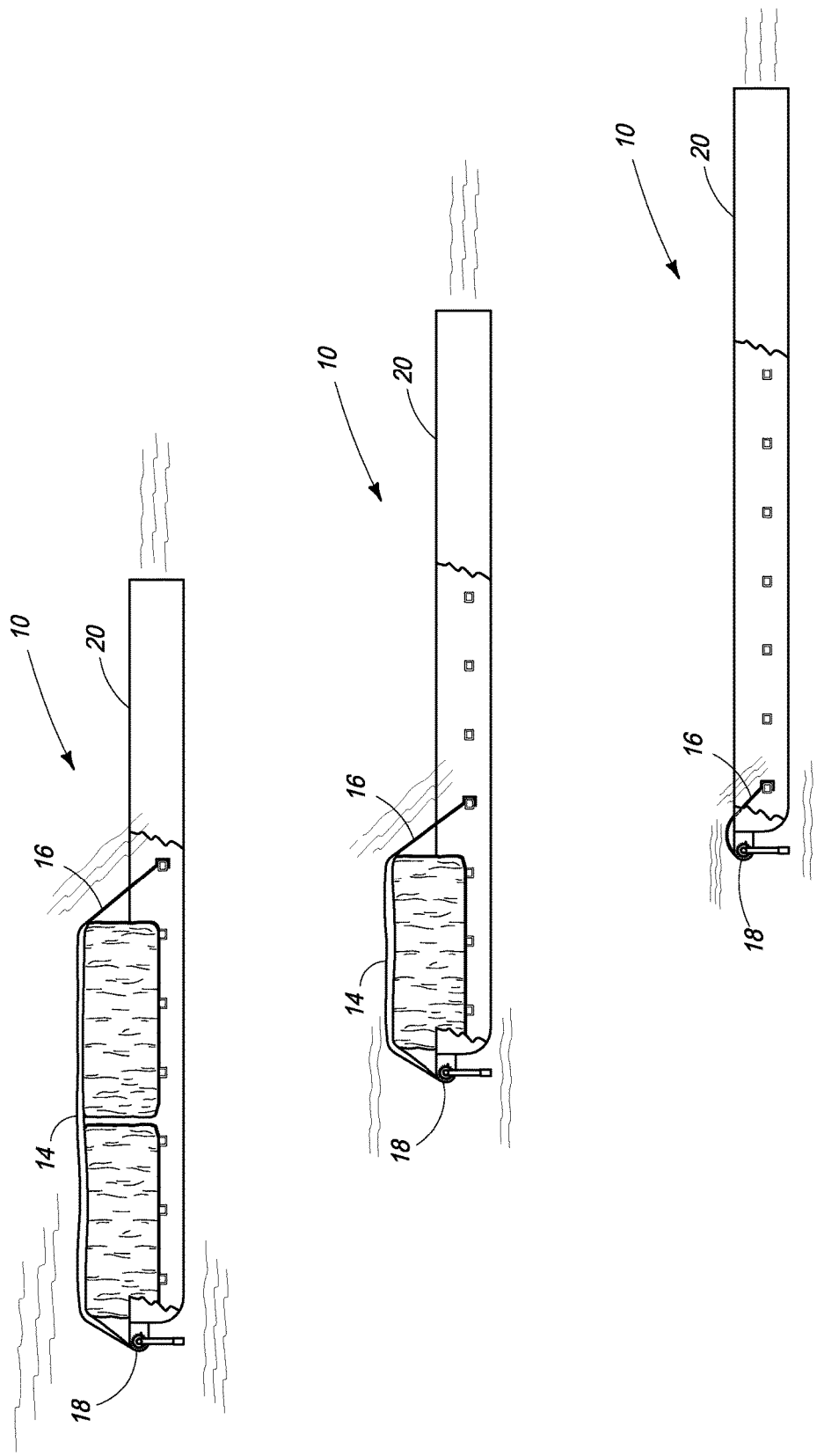

VEHICLE ROOFTOP CARGO SYSTEMS AND METHODS FOR TRANSPORTING CARGO UPON THE ROOFTOP OF VEHICLES

CROSS REFERENCE TO RELATED APPLICATION

This application claims priority to U.S. Provisional Patent Application Ser. No. 61/829,156 entitled "Trailer Rooftop Cargo Carriage/Systems and Methods for Transporting Cargo Upon the Rooftop of a Trailer", which was filed on May 30, 2013, the entirety of which is incorporated by reference herein.

TECHNICAL FIELD

The present disclosure relates generally to the transportation of cargo and more specifically, to the transportation of cargo upon the rooftop of vehicles. Particular embodiments of the disclosure relate to the transportation of hay bales upon the rooftop of animal trailers.

BACKGROUND

It has become increasingly important to be able to transport items upon the rooftop of vehicles. Some vehicles make it more difficult to transport items and the items themselves make them very difficult to transport. One example is animal trailers. Animal trailers tend to be quite large and consume a height that is substantially larger than the vehicle pulling the trailer. Animal trailers typically require animal feed. One such feed is hay, for example. As an example, horses can be transported in trailers, and hay is usually transported with the horses as feed. It would be convenient if the hay could be transported with negligible loss of the hay due to wind and weather surrounding the travel of the trailer. The present disclosure provides vehicle rooftop cargo systems and methods for transporting cargo upon the rooftop of a vehicle.

SUMMARY OF THE DISCLOSURE

Vehicle rooftop cargo systems are provided that can include: a forward panel extending from a first end laterally across the vehicle to a second end; a tarp biasing system associated with the forward panel, the system comprising a tarp having coupling members along a free end; opposing first and second side panels, the first side panel extending longitudinally along the vehicle from the first end of the forward panel, and the second side panel extending longitudinally along the vehicle from the second end of the forward panel; and a plurality of cross members extending laterally between the side panels and distributed longitudinally along the cargo system, the coupling members of the free end of the tarp configured to mate with the cross members.

Methods for transporting cargo upon the rooftop of a vehicle are also provided. The methods can include: supporting a plurality of pieces of cargo upon cross members extending between opposing side panels, the side panels extending from the rooftop of the vehicle; extending a tarp from a forward panel to over the pieces of cargo; coupling the tarp with one of the cross members; biasing the tarp against the one of the cross members; uncoupling the tarp; removing at least one of the pieces of cargo; recoupling the tarp to one or another of the cross members; and rebiasing the tarp against the one or another of the cross members.

Methods for transporting baled hay upon the rooftop of an animal trailer are also provided. The methods can include: supporting a plurality of hay bales upon cross members extending between opposing side panels, the side panels extending from the rooftop of the vehicle; extending a tarp from a forward panel to over the hay bales; coupling the tarp with one of the cross members; biasing the tarp against the one of the cross members; uncoupling the tarp; removing at least one of the hay bales; recoupling the tarp to one or another of the cross members; and rebiasing the tarp against the one or another of the cross members.

DRAWINGS

Embodiments of the disclosure are described below with reference to the following accompanying drawings.

FIG. 6 is a depiction of a series of stages of cargo transport according to embodiment of the disclosure.

DESCRIPTION

This disclosure is submitted in furtherance of the constitutional purposes of the U.S. Patent Laws "to promote the progress of science and useful arts" (Article 1, Section 8).

Figure 1:
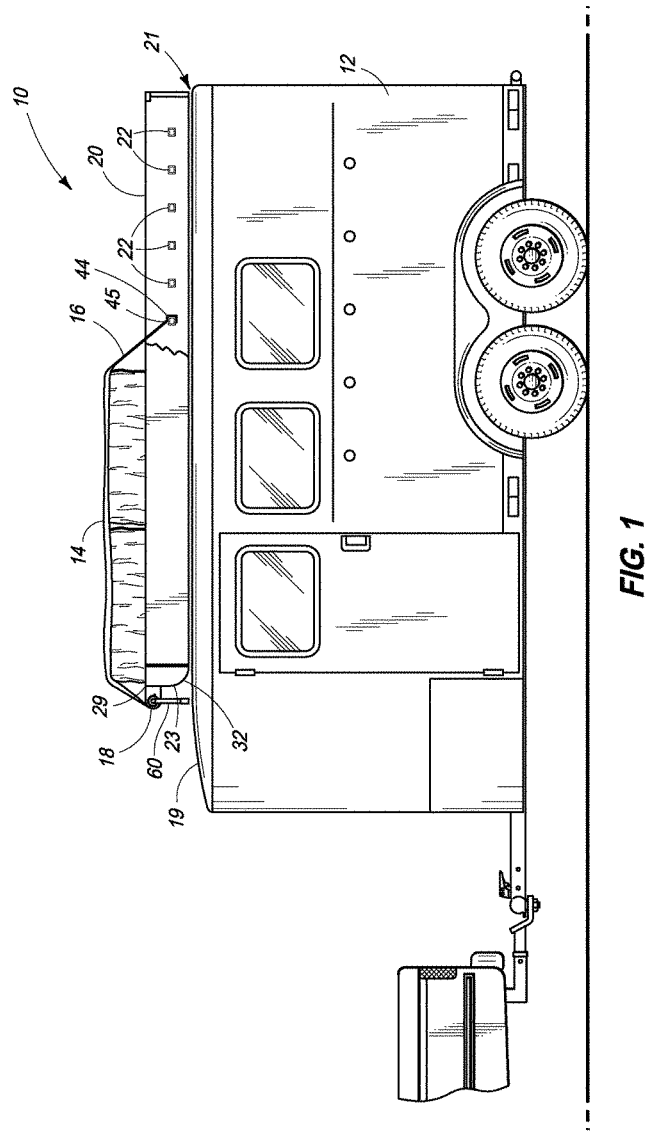
FIG. 1 is a depiction of the cargo system above a trailer according to one view.

The cargo systems and methods of implementing same will be described to FIGS. 1-6. Referring first to FIG. 1, a trailer and cargo system are shown with cargo system 10 residing on the rooftop of a vehicle 12, such as an animal trailer. In accordance with example implementations, cargo system 10 includes a tray 20 which resides proximate rooftop 19 of vehicle 12. Tray 20 can reside above rooftop 19 and define a space 21 between tray 20 and rooftop 19. During transportation, air can proceed through space 21. Tray 20 can include a forward panel 23 which can extend from a first end 25 to a second end 27 laterally across vehicle 12. In accordance with example implementations, forward panel 23 can be substantially normal to rooftop 19 and/or include an upper edge 29. Forward panel 23 can also include a curved portion 32 extending to a lower edge. Tray 20, as with most components of the cargo system, can be constructed of a lightweight but strong metallic composition. Other compositions may be utilized as well.

In accordance with example implementations, system 10 further includes a tarp 14 which can be extended or withdrawn to a biasing system 18, and tarp 14 can have a coupling system extending therefrom. In accordance with example implementations, the biasing system can be placed at the hitch end of trailer 12, while the coupling system can be configured to reside at the tailgate or rear end of trailer 12. System 18 can be associated with forward panel 23. Tarp 14 can have coupling members 44 extending from free end 45 of tarp 14. System 18 can be aligned between upper edge 29 and rooftop 19 on forward panel 23. Tarp 14 can extend laterally between panels 70 and 72. System 18 can include a hand crank 60.

Figure 2:
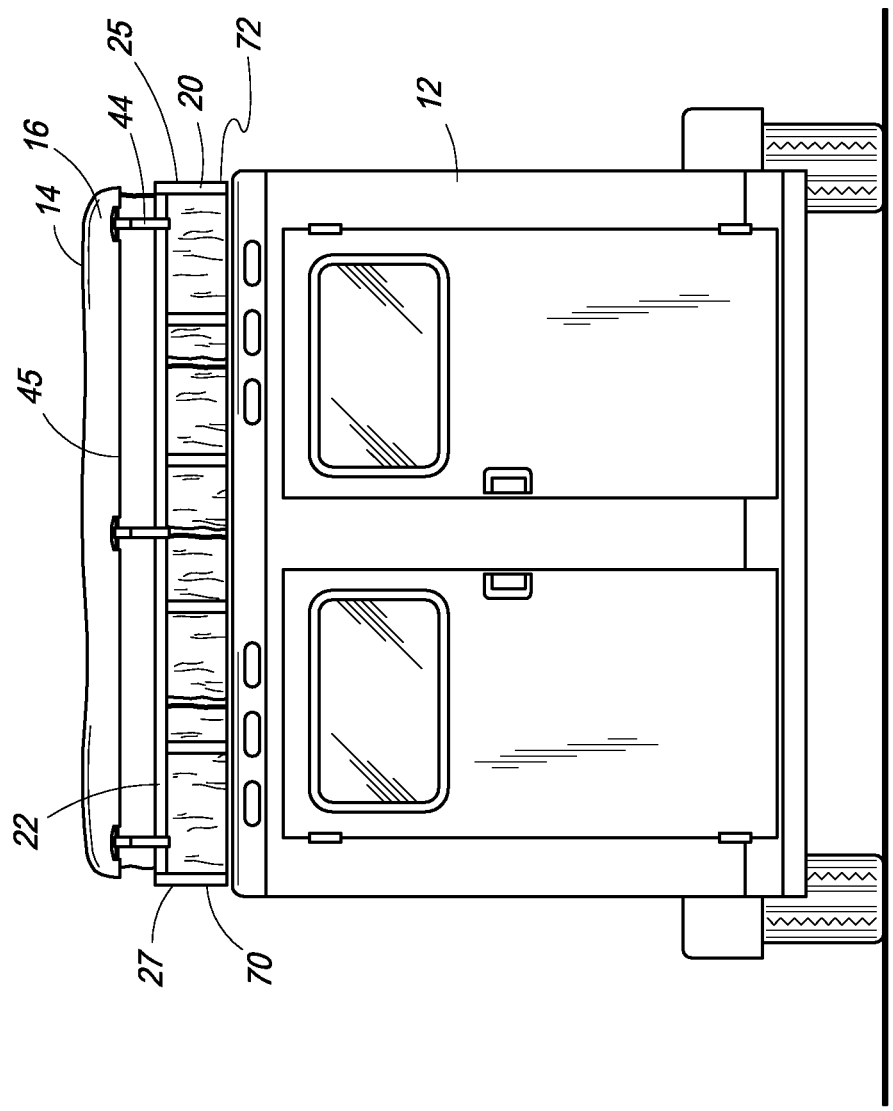
FIG. 2 is a depiction of the cargo system of FIG. 1 according to another view.

Referring to FIG. 2, another view of trailer 12 having cargo system 10 thereon is shown. As can be seen, system 10 can include cross members 22. These can be extensions that reside in the width or extend between opposing side panels 70 and 72 within tray 20. They also may provide support for cargo such as hay bales within cargo system 10. In accordance with example implementations, these cross members can be configured to couple with coupling system 16.

Figure 3:
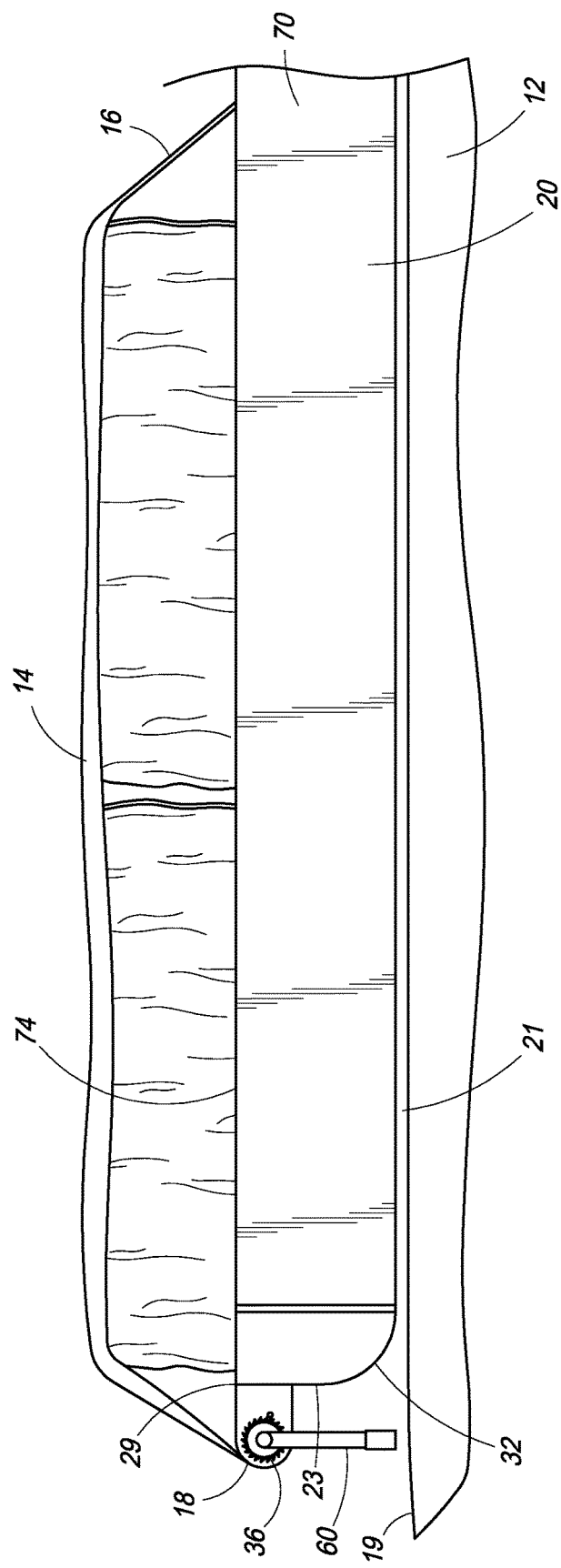
FIG. 3 is a more detailed view of the cargo system according to an embodiment.

Referring to FIG. 3, a more detailed view of cargo system 10 is shown wherein ratchet 36 extends to control the bias of tarp 14 as it extends to coupling system 16 above tray 20. As can be seen, tray 20 can include a nonlinear portion 32 proximate the hitch end of the trailer and a space 21 residing between tray 20 and the roof of trailer 12. This can aid and abet the airflow as it proceeds past cargo system 10 while being utilized.

Figure 4:
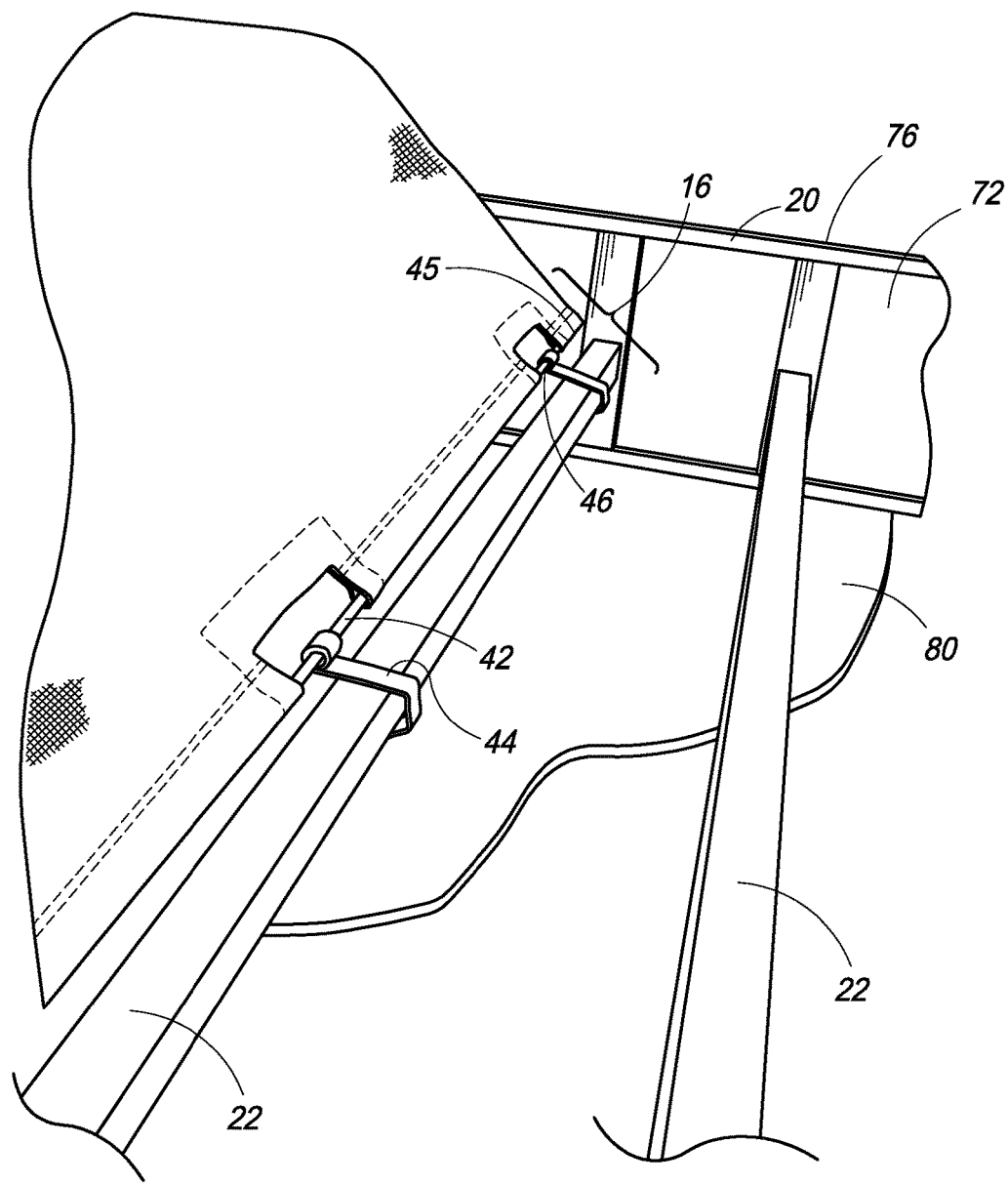
FIG. 4 is a detailed view of a portion of the cargo system according to an embodiment.

Referring next to FIG. 4, a more detailed view of coupling system 16 in use is shown. As can be seen, cross members 22 can extend between walls (side panels) of tray 20. Cross members 22 can also be support structures that can support cargo such as hay. In accordance with example implementations, there can be a plurality of these cross members that extend between the support structures, giving the operator the ability to store or carry different numbers of uniform cargo such as hay bales, for example.

As shown in FIG. 4, the cross members are substantially rectangular. Other cross members may be utilized as well, such as round or spindle cross members. Coupling system 16 can include rod 42 extending the length of tarp 14 having hook 44 rotationally mounted thereto. In accordance with example implementations, hook 44 can include a rotational mount 46 that can extend around rod 42.

With reference to the figures, side panels 70 and 72 are shown as part of tray 20. First side panel 70 can extend longitudinally along vehicle 12 from first end 27, and second side panel 72 can extend longitudinally along vehicle 12 from second end 25. Each of side panels 70 and 72 can include edges 74 and 76; each of these edges can align with edge 29.

Cross members 22 can extend laterally between panels 70 and 72. Members 22 can be distributed longitudinally along system 10. Members 22 can be spaced equidistant from one another, and may be coupled to the side panels and/or panel supports.

Tray 20 can include a floor 80. Floor 80 can be coupled to three panels, forward and side, without being coupled to a rear panel.

Figure 5:
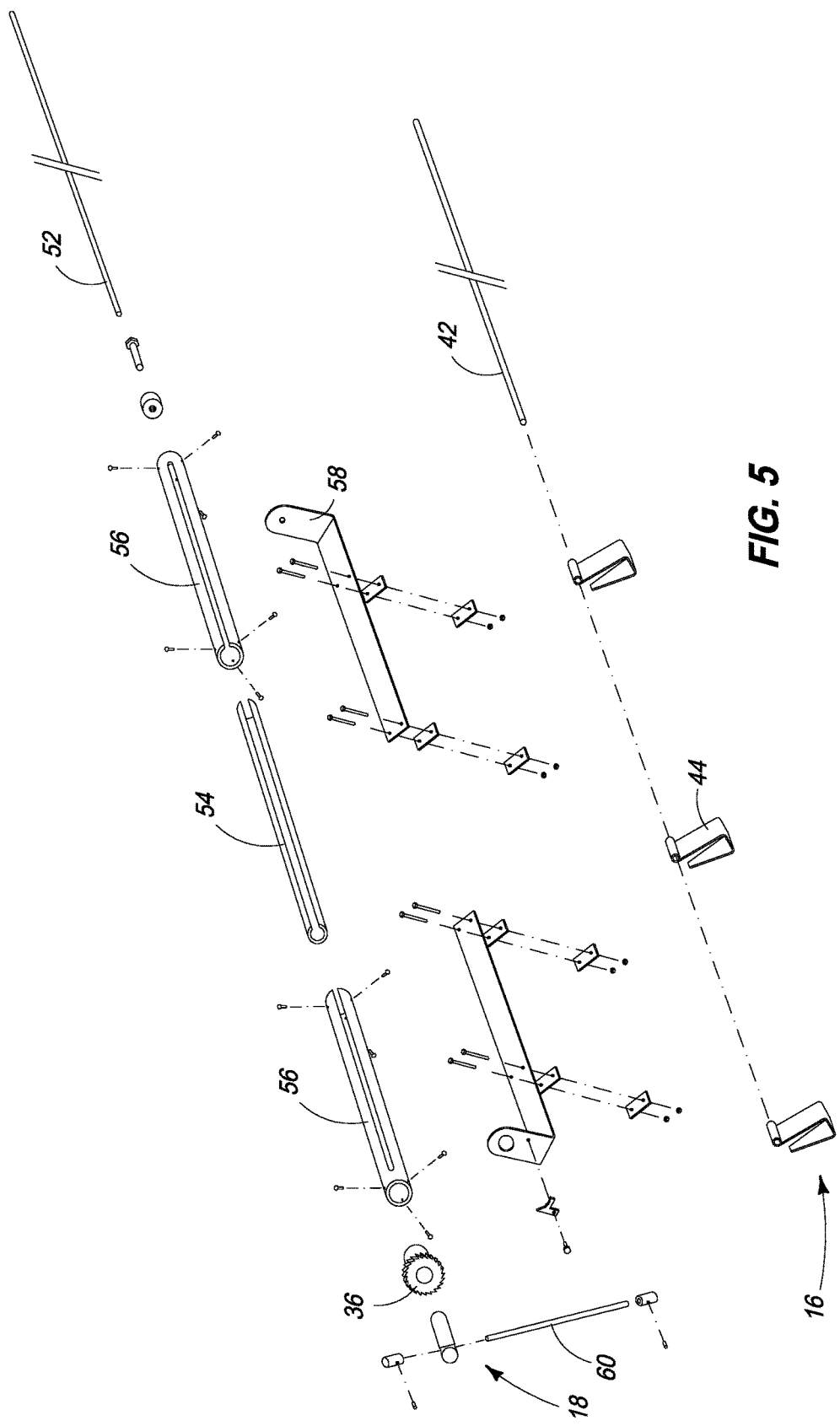
FIG. 5 is a more detailed view of components of the cargo system according to an embodiment.

Referring to FIG. 5, components of coupling system 10 are shown such as biasing system 18 and coupling system 16. As can be seen, biasing system 18 can include a rod 52 that extends to an interior spindle that is also encompassed by exterior spindles 56. Rod 52 and the spindles can be rotationally coupled to a bracket 58 which may be mounted to a sidewall of tray 20, for example. The control and/or biasing of tarp 14 in relation to cargo within tray 20 can be biased using a cogged wheel, such as ratchet 36, coupled to a handle 60.

Referring to FIG. 6, a depiction of a series of configurations of the rooftop cargo system of the present disclosure are provided. In accordance with example embodiments, methods for transporting cargo upon the rooftop of a vehicle are provided. The methods can include supporting a plurality of pieces of cargo upon cross members extending between opposing side panels. As can be seen, side panels can extend from rooftop of vehicle. The methods can include extending tarp from forward panel to over pieces of cargo, and/or coupling tarp with one of the cross members. The methods can provide for biasing the tarp against the one of the cross members. The tarp can then be uncoupled, for example, by providing slack to the bias from the tarp biasing system, and at least one of the pieces of cargo can be removed. The methods can then provide for recoupling the tarp to one or another of the cross members, and rebiasing the tarp against the one or another of the cross members.

The methods for transporting the cargo can also include allowing air to proceed between the pieces of cargo and the rooftop of the vehicle during the transporting. The methods can also provide for creating a low pressure region at the rearward most portions of the cargo, and/or allowing air to proceed over the tarp from the forward panel and down between the opposing side panels.

As can be seen, the cargo can be hay bales and/or the rooftop can be that of an animal trailer. Upon removal of all bales, the method can include coupling the tarp to the most forward cross member.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A method for transporting cargo upon the rooftop of a vehicle, the method comprising:
    supporting a plurality of pieces of cargo upon cross members extending between opposing side panels bounded by front and rear panels, the panels extending from the rooftop of the vehicle, and the cross members and the rooftop having a space therebetween;
    unrolling a tarp from a biasing system coupled to the front panel to cover the pieces of cargo;
    coupling a free end of the tarp with one of the cross members;
    without additional cargo securing members, biasing the tarp against the one of the cross members using a handled crank of the biasing system to secure the cargo in place between at least some of the cross members and the tarp;
    releasing the bias on the tarp and uncoupling the free end of the tarp;
    removing at least one of the pieces of cargo;
    recoupling the free end of the tarp to the one or another of the cross members; and
    without additional cargo securing members, rebiasing the tarp against the one or another of the cross members using the handled crank of the biasing system to secure the cargo in place between at least some of the cross members and the tarp.

2. The method of claim 1 further comprising transporting the pieces of cargo with the vehicle, and during the transporting allowing air to proceed between the pieces of cargo and the rooftop of the vehicle.

3. The method of claim 1 further comprising transporting the pieces of cargo with the vehicle, and during the transporting creating a low pressure region at the rearward most portions of the cargo.

4. The method of claim 1 further comprising transporting the pieces of cargo with the vehicle, and during the transporting allowing air to proceed over the tarp from the biasing system and down between the opposing side panels.

5. The method of claim 1 wherein the cargo is baled hay.

6. The method of claim 1 wherein the vehicle is an animal trailer.

7. The method of claim 1 further comprising removing all cargo from between the opposing side panels and coupling the tarp to the most forward cross member.

* * * * *

UNITED STATES PATENT AND TRADEMARK OFFICE
CERTIFICATE OF CORRECTION

Page 1 of 1

PATENT NO. : 9,707,900 B1
APPLICATION NO. : 14/290841
DATED : July 18, 2017
INVENTOR(S) : Larry Townsend It is certified that error appears in the above-identified patent and that said Letters Patent is hereby corrected as shown below:

(56) References Cited – Replace "7,111,998 B2 9/2006 Wright" with --7,111,908 B2 9/2006 Mills--

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*